United States Patent [19]

Johnson

[11] Patent Number: 5,075,808
[45] Date of Patent: Dec. 24, 1991

[54] RETAINING CLAMP FOR A DISC STORAGE APPARATUS

[75] Inventor: James L. Johnson, San Jose, Calif.

[73] Assignee: Kabushiki Kaisha Toshiba, Japan

[21] Appl. No.: 428,848

[22] Filed: Oct. 30, 1989

[51] Int. Cl.$^5$ ............................................. G11B 17/02
[52] U.S. Cl. .............................. 360/98.08; 360/98.07; 360/99.12
[58] Field of Search ............... 360/98.01, 98.02, 98.07, 360/98.08, 99.12; 369/270, 271

[56]  References Cited
U.S. PATENT DOCUMENTS

| | | | |
|---|---|---|---|
| 4,300,176 | 11/1981 | Gilovich | 360/105 |
| 4,751,597 | 6/1988 | Anderson | 360/106 |
| 4,918,545 | 4/1990 | Scheffel | 360/98.08 |

OTHER PUBLICATIONS

"Disk Pack Clamping Ring", IBM TDB, vol. 28, No. 11, Apr. 1986, pp. 4957–4958.
Reinforced Circular Push-On, External Series 5115 "Waldex Truarc Retaining Rings", p. 100.

*Primary Examiner*—David J. Severin
*Attorney, Agent, or Firm*—Limbach, Limbach & Sutton

[57] ABSTRACT

In the present invention, an improved retaining member for a disc drive is disclosed. The disc drive has a spindle with a plurality of data storage discs mounted on the spindle. The retaining member is in the shape of a ring with a central hole and a plurality of spaced-apart teeth-shaped members positioned circumferentially about the ring and protruding into the central hole. The retaining member is positioned with the spindle through the central hole and substantially abuts one of the data storage discs. The plurality of teeth-shaped members are urged against the side of the spindle.

5 Claims, 8 Drawing Sheets

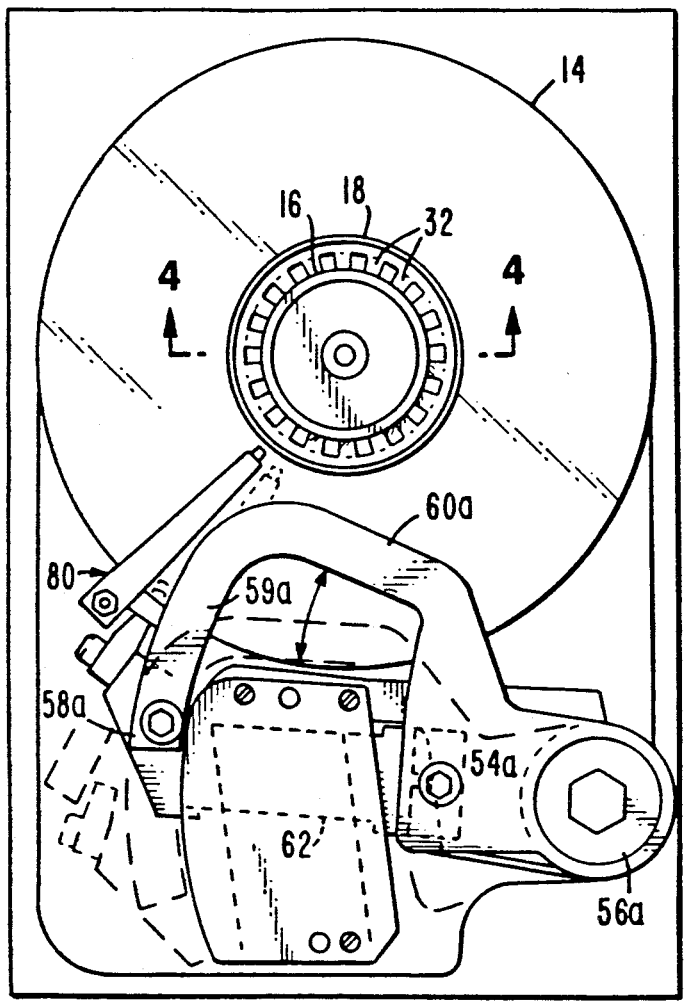
FIG. 2
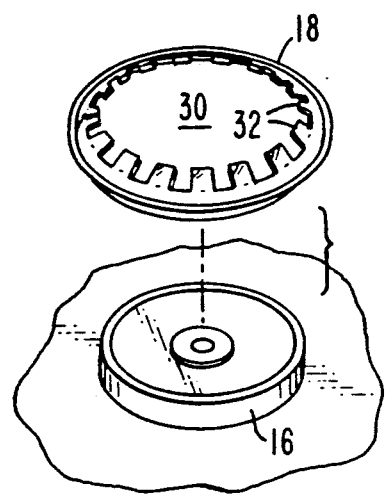
FIG. 3
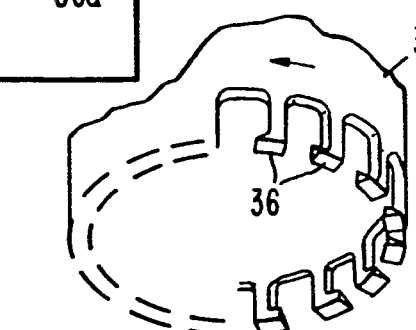
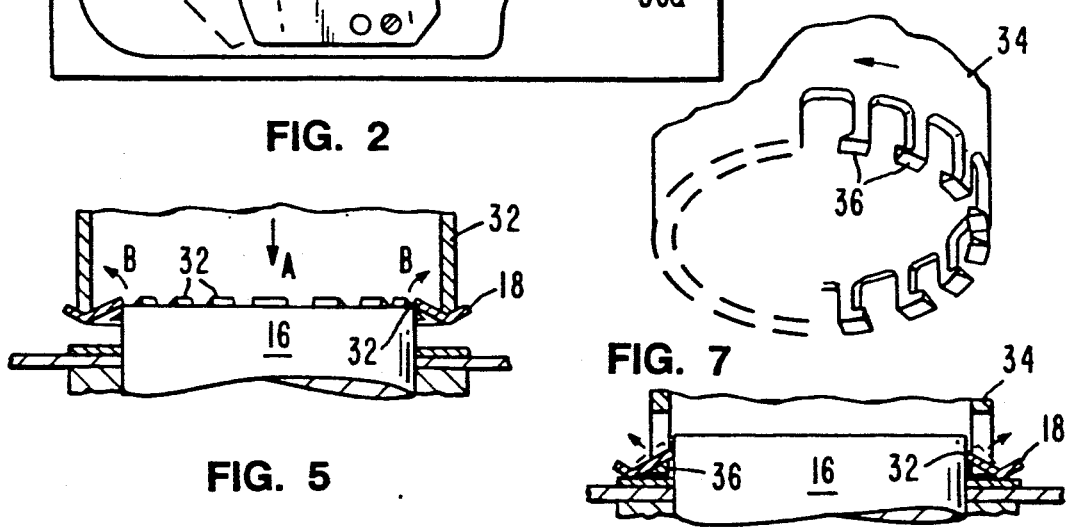
FIG. 5
FIG. 7
FIG. 6
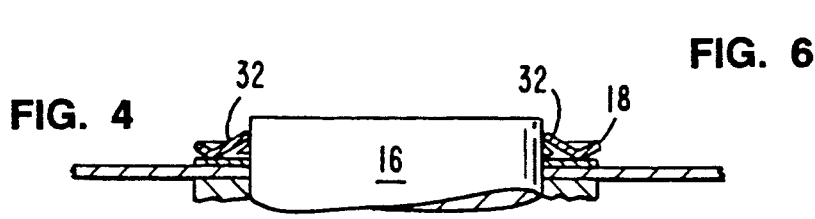
FIG. 4

RETAINING CLAMP FOR A DISC STORAGE APPARATUS

TECHNICAL FIELD

The present invention relates to a retaining clamp to clamp a plurality of data storage discs on a rotatable spindle in a disc drive. The improved retaining clamp supplies substantially uniform force to the data storage discs and can be easily removed and applied with A minimal amount of contamination to the data discs.

BACKGROUND OF THE INVENTION

Direct Access Storage Devices (DASD), such as disc drives, are well-known in the art. A typical prior art disc storage apparatus has a base with one or more data storage discs rotatably mounted on the base and a motor to rotate the discs. A pivot assembly is mounted on the base and is fixedly attached to the base at one end of the pivot assembly. A transducer assembly having one or more transducer heads is mounted on the pivot assembly at the other end. An actuating means, such as a voice coil motor, is positioned between the transducer assembly and the fixed end of the pivot assembly. The voice coil motor moves the pivot assembly, thereby moving the transducer assembly with the transducer heads moved over the surface of the discs. See, for example, U.S. Pat. Nos. 4,751,597 and 4,300,176. Although such an arrangement is compact, these prior art devices have suffered from the disadvantage of poor frequency response.

Further, as glass becomes the choice of consideration for the substrate of the storage discs, in the disc drive, it becomes desirable to retain or hold the glass discs in place, such that the glass will not slip, warp or break. In addition, it is desired to be able to control the amount of the clamping force on the stack of discs. The force cannot be so high as it will break the glass disc, nor it can be so low as to cause the disc to slip under shock and vibration. The clamping force must be constant or nearly so with dimensional changes experienced under temperature variations.

Conventional retaining rings, used in automobiles and agricultural equipment, purchasable from, for example, Walds Truarch, is well-known in the art.

Finally, as the size of discs decreases, it becomes increasingly desirable to use zone band recording, to record magnetic information on the discs. In zone band recording, different density of recording is achieved at different radius, resulting in a constant number of bytes per track recording. However, zone band recording requires the transducer head to be at a nearly constant height over the disc surface. In the prior art, one company, DASTech, has proposed the use of radically-designed transducer heads to maintain the head at a constant or substantially constant flying height over the disc. However, to date, it is not believed that a conventional head can be maintained at a constant flying height over the surface of the disc.

SUMMARY OF THE INVENTION

In the present invention, a disc storage apparatus having a spindle, a plurality of data storage discs mounted on the spindle and a motor connected to the spindle for rotating the discs is disclosed. The improvement comprises a retaining clamp in a shape of a ring with a central hole and a plurality of spaced-apart teeth-shaped members positioned circumferentially about the ring protruding into the central hole. The retaining clamp is positioned with the spindle through the central hole and with the retaining clamp substantially abutting one of the data storage discs with the plurality of teeth-shaped members urging against the side of the spindle.

BRIEF DESCRIPTION OF THE DRAWINGS

FIG. 2 is a top view of the disc storage apparatus, shown in FIG. 1, with a pivot assembly being movable about the extreme pivoting positions.

FIG. 3 is a perspective view of a retaining clamp portion of the disc storage apparatus of the present invention showing the retaining clamp in relationship to a spindle to which the data storage discs are mounted.

FIG. 4 is a partial cross-sectional side view of the disc storage apparatus showing the retaining clamp in a retaining position urging against the side of the spindle and against the outermost data storage disc.

FIG. 5 is the same cross-sectional view as FIG. 4, showing the retaining clamp being inserted, by an insertion tool, on the spindle of the data storage apparatus of the present invention.

FIG. 6 is the same cross-sectional view as FIG. 4, showing a removal tool in position to remove the retaining clamp from its retaining position.

FIG. 7 is a bottom perspective view of the removal tool for removing the retaining clamp from its retaining position on the spindle of the data storage apparatus.

DETAILED DESCRIPTION OF THE DRAWINGS

Figure 1:
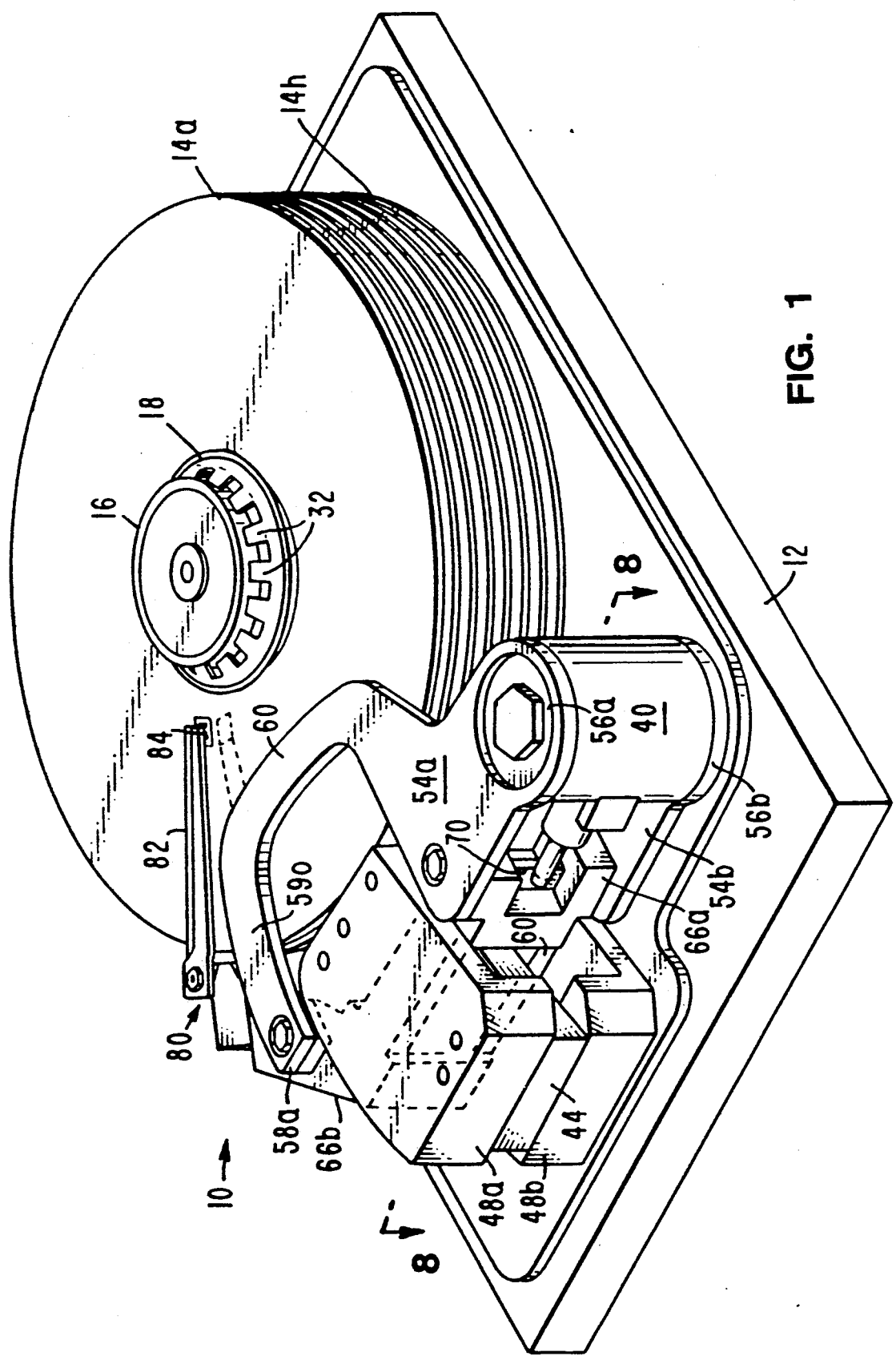
FIG. 1 is a perspective view of the disc storage apparatus of the present invention with the cover removed, showing the major elements of the disc storage apparatus.

Referring to FIG. 1, there is shown a disc storage apparatus 10 of the present invention. The disc storage apparatus 1? is shown with its cover off exposing the various major elements of the disc storage apparatus 10. The disc storage apparatus 10 comprises a base 12. Mounted on the base 12 is a plurality of data storage discs 14(a..h). Although eight data storage discs 14 are shown, clearly, the invention is not so limited in the number of data storage discs that can be used.

The data storage discs 14 are all mounted on a spindle 16 and are ganged for rotation about the spindle 16 by a motor 18. The plurality of data storage discs 14 are held in place on the spindle 16 by a retaining clamp 18. A center shaft 22 of the spindle 16 is fixedly attached to the cover (not shown), passing through the motor 18 and is fixedly attached to the base 12.

The motor 18 has a coil 24 fixedly attached to the shaft 22. Surrounding the coil 24 are permanent magnets 20 which are connected to the spindle 16. When coil 24 is energized, electromagnetic forces cause the magnet 20 and the spindle 16 attached thereto and the data storage discs 14 to rotate relatively to the center shaft 22. The motor 18 is of conventional design.

Each of the data storage discs 14 is made of a substrate material, such as glass, on which is deposited a magnetically susceptible material whose magnetic domains can change under the influence of locally-applied magnetic forces. The retaining clamp 18 is in the shape of a ring with a central hole 30 and a plurality of spaced-apart teeth-shaped members 32 positioned circumferentially about the ring. The teeth-shaped members 32 protrude into the central hole 30. The retaining member 18 is of conventional design and has been used by automotive and agricultural equipment to hold members onto a rod, and is available from company such as Walds Truarch.

Referring to FIG. 5, there is shown a partial, cross-sectional view of an insertion tool 32 used to assemble the retaining member 18 onto the spindle 16. During the assembly process, the retaining clamp 18 is urged in an axial direction, shown by the arrow A, along the axis of the spindle 16. The insertion tool 32 is urged along the ring portion of the retaining clamp 18. The hole 30 of the retaining clamp 18 is positioned over the spindle 16 and as the retaining clamp 18 is urged axially along the axis of the spindle 16, each of the teeth-shaped member 32 comes into contact with the end of the spindle 16 and is moved in a direction shown by the arrows B. The retaining clamp 18 is placed in a retaining position when the retaining clamp 18 abuts the topmost data storage disc 14a. When the retaining clamp 18 is in the retaining position, each of the tooth-shaped members 32 is urged against the side of the spindle 16. This is shown in FIG. 4.

The use of the retaining clamp 18 to clamp the plurality of disc 14 provides the following advantages. The amount of clamping force by the retaining clamp 18 against the plurality of disc 14 is controlled by the force that is applied by the insertion tool 32 in the axial direction, when the retaining clamp 18 is inserted on the spindle 16. Thus, the degree of force is controlled by the insertion tool 32. The plurality of discs 14 can be clamped with a relatively light force for balancing. For example, discs can be purposely shifted to obtain correct dynamic balance, when a light force is applied by the retaining clamp 18. Once the balance is determined, a final application of force by the insertion tool 32 can be made onto the retaining clamp 18 to increase the clamping force. Further, the retaining clamp 18 provides flat spring constant to maintain substantially constant force to the plurality of discs 14 during temperature cycle. The uniform clamping force that is applied to the plurality of discs 14 eliminate stress concentration so as not to break a disc 14 whose substrate is made of fragile material, such as glass. Compared to a conventional screw for attachment, the use of the retaining clamp 18 provides for maximum stiffness and uniform load distribution which allows the use of large spindle bearings which improves spindle runout, spindle stiffness and spindle life. In addition, compared to the conventional screw, there is no contamination, when the retaining clamp 32 is used.

Referring to FIG. 6, there is shown a removal tool 34 which can be used to remove the retaining clamp 18 from the spindle 16. The removal tool 34 has a plurality of hook-shaped members 36. Each of the hook-shaped members 36 has a width which is narrower than the spacing between a pair of adjacent teeth-shaped members 32. Thus, the hook-shaped members 36 can be inserted into the space between the adjacent teeth-shaped members 32. The removal tool 34 is then rotated by an amount such that a portion of the hook-shaped member 36 is between the teeth-shaped member 32, the disc 14a and the spindle 16. An axial force is then used to move each of the teeth shaped members 32 away from the side of the spindle 16 and to lift the retaining clamp 18 in an axial direction away from the spindle 16. In this manner, the retaining clamp 18 is thus removed from the spindle 16.

Figure 10:
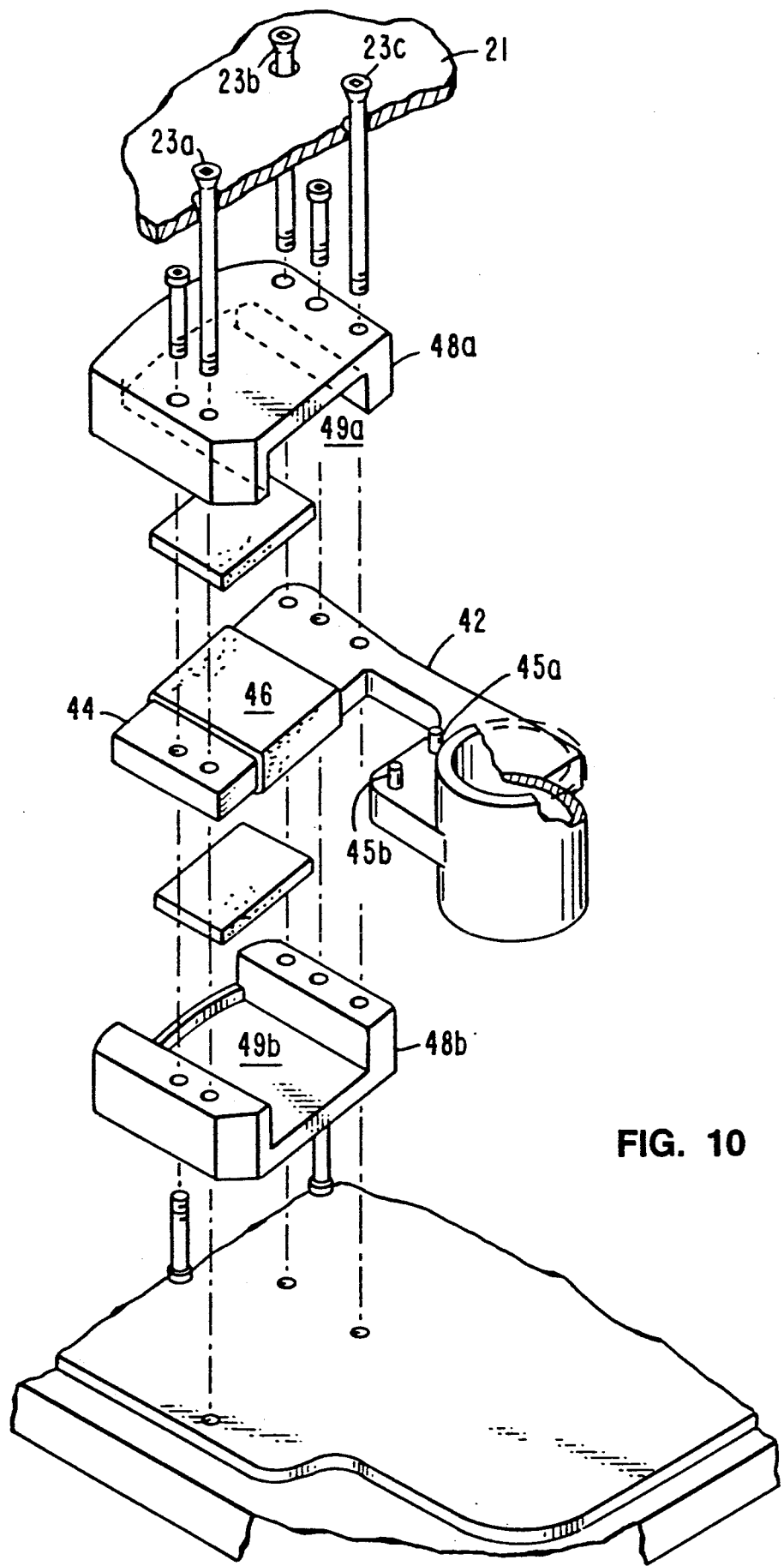
FIG. 10 is an exploded view of a pivoting post and a magnet attached thereto, which are fixedly attached to the base of the data storage apparatus.

The disc storage apparatus 10 also comprises a pivoting post 40. The pivoting post 40 is cylindrically-shaped and is substantially hollow on the inside (see FIG. 10). The pivoting post 40 is attached to a planar member 42 which is substantially in the shape of a letter L. Along the base portion 44 of the planar member 42 is a permanent magnet 46. The permanent magnet 46 has substantially a rectangularly-shaped cross-section. The planar member 42 is fixedly attached to the base 12 and the cover 21 by the screws 23(a,b,c). Thus, the pivoting post 40 is also fixedly attached with respect to the base 12. An upper-casing 48a and a lower-casing 48b encase the magnet 46, providing for the cavities 49a and 49b, between the magnet 46 and the upper case 48a and the lower case 48b, respectively. Collectively the cavities 49a and 49b serve as a region in which the coil 60 (discussed hereinafter) is positioned. The planar member 42 also comprises two stop posts: 45a and 45b, which are cylindrically-shaped members spaced apart from the pivoting post 40. The function of these stop posts 45a and 45b will be discussed hereinafter.

Figure 11:
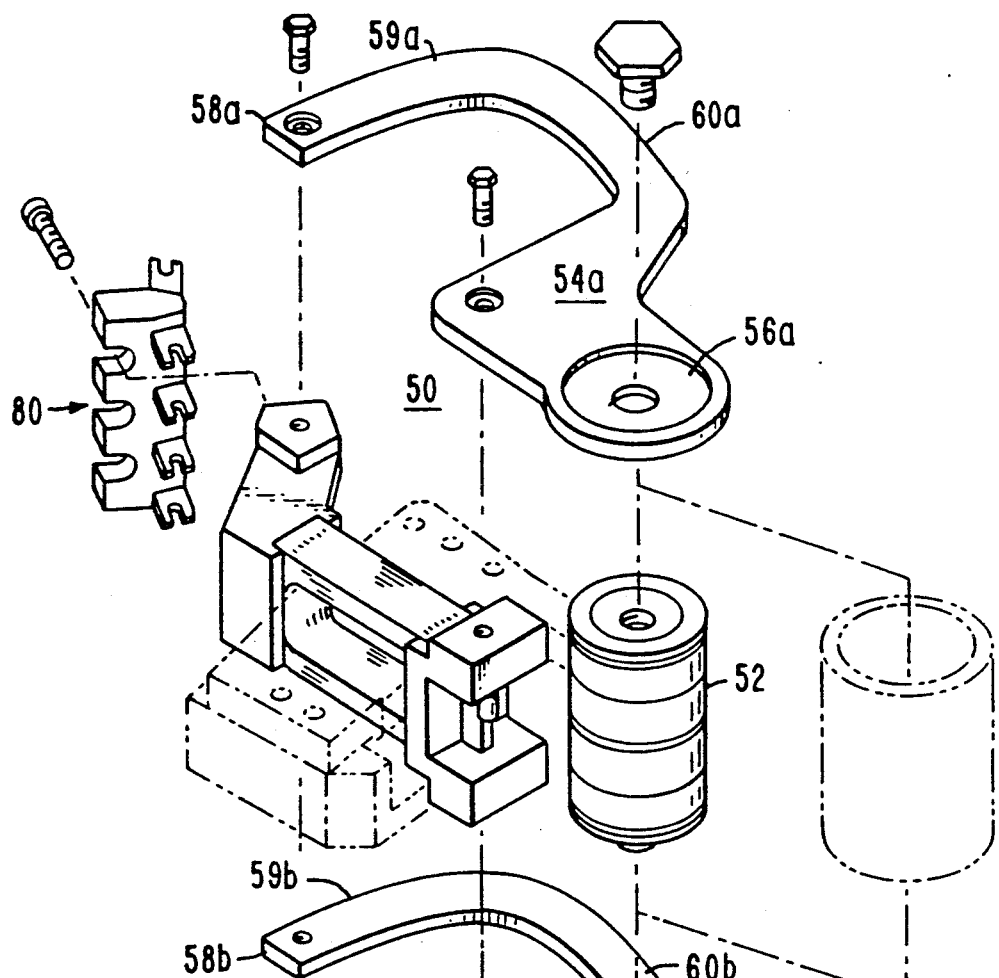
FIG. 11 is an exploded view of a pair of support arms and an electrical coil assembly therebetween which is a portion of the pivot assembly of the data storage apparatus of the present invention.

The disc storage apparatus 10 also comprises a pivoting assembly 50 (shown in FIG. 11). The pivoting assembly 50 comprises an axial post 52 which is substantially cylindrically shaped. The axial post 52 is positioned within the pivoting post 40 and is pivotally rotatably about the pivoting post 40. At one end of the axial post 52 (the upper end) is a first supporting member 54a connected thereto. A second supporting member 54b, substantially congruent in shape to the first supporting member 54a, is attached to the axial post 52 at the other end thereof. Each of the supporting members 54a and 54b has one end 56 connected to the axial post 52. The other end 58 of the supporting member is free to pivot about the fixed end 56. Between the pivotally movable end 58 and the fixed end 56, the supporting member 54 is substantially curved in shape having an arcuate region 60.

Figure 12:
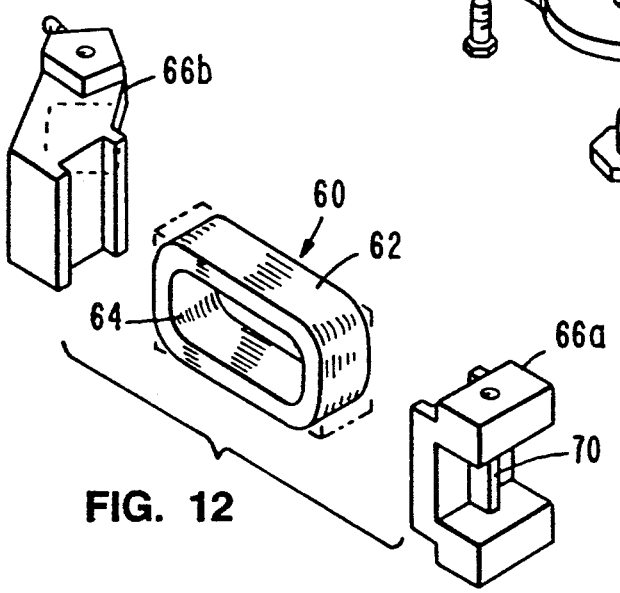
FIG. 12 is an exploded view of the coil assembly portion of the support assembly shown in FIG. 11.

Within the arcuate region 60, i.e., substantially along a line defined from the pivoting end 58 to the fixed end 56, and substantially near the center of percussion of the pivoting assembly 50, is attached a coil assembly 60. As shown in FIG. 12, the coil assembly 60 comprises a coil 62 which has a cross-sectional shape that is substantially rectangular in shape. Two coil supporting members: 66a and 66b are position to each side of the coil 62 and are fixedly attached to the support members 54a and 54b of the pivoting assembly 50. Within the rectangularly-shaped cross-section of the coil 62 is a rectangularly-shaped cross-sectional hole 64 in which is positioned the magnet 46. Thus, as the coil 62 is energized, it exerts a force with respect to the magnet 46 causing the pivoting assembly 50 to pivot about the pivoting post 40.

Figure 15:
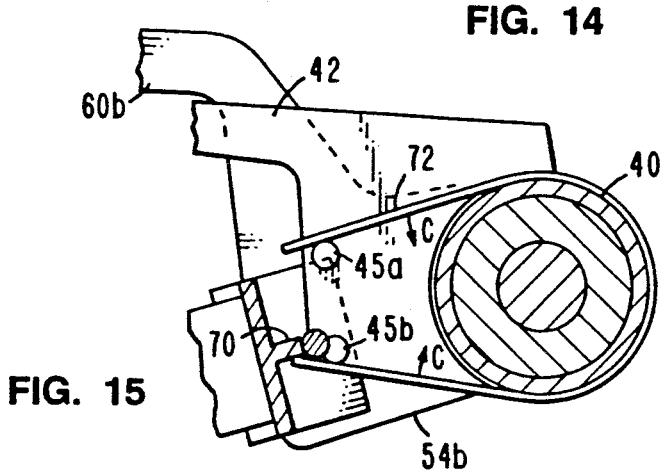
FIG. 15 shows two stop posts and a spring wound about the pivoting post with the protrusion of the coil assembly resting against one end of the spring.

The coil assembly 60 also comprises a protruding member 70 which is connected to one end of one of the coil supporting member 66a. Wound about the pivoting post 40 is a spring 72. The spring 72 is wound about the pivoting post 40, such that it comes to rest against the stop posts 45a and 45b. The spring 72 has a tension force shown in the direction of the arrow C, as shown in FIG. 15. The spring 72 has two ends, each of which extends beyond the stop posts 45a and 45b. The protruding member 70 of the coil assembly 60 lies in the region between the ends of spring 72 and moves therebetween. However, if excessive electrical power is applied to the coil 62 causing excessive magnetic force to be generated in either direction, the coil 62 and the protruding member 70 would come to rest against one of the ends of the spring member 72. Since the spring 72 is resilient but has an urging force, the coil 62 would be opposed by a resilient force. In this manner, the spring 72 acts as a stop to prevent the coil 62 from moving excessively in either direction beyond the intended limits of operation. The use of the spring 72 prevents damage to the coil assembly 60 in that no fixed stop is provided. Instead, the coil assembly 60 is allowed to come to rest against an urging force that increases as the coil 62 attempts to increase beyond its limits.

Figure 13:
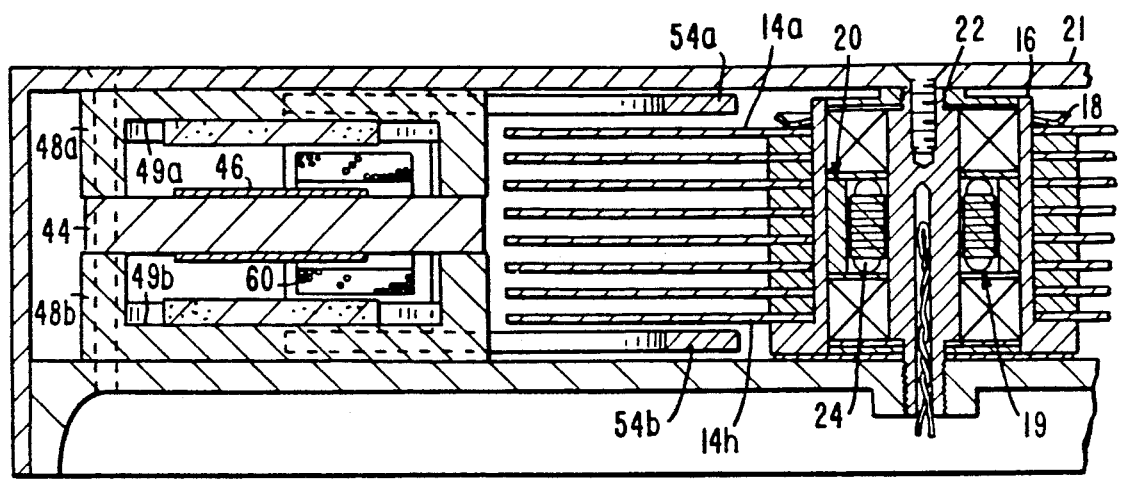
FIG. 13 is a cross-sectional view through the coil and magnet portion shown in FIG. 9 and through the plurality of data storage discs attached to the spindle and the motor which drives the spindle.
Figure 14:
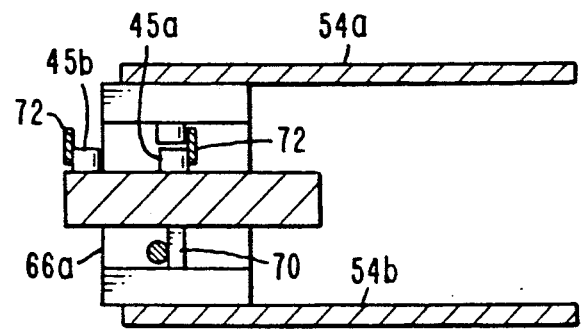
FIG. 14 is a partial, cross-sectional view of the support assembly shown in FIG. 9, showing the protrusion attached to the coil assembly.

When the coil assembly 60 is activated and the pivoting assembly 50 is moved about the pivoting post 40, the upper supporting member 54a passes over the topmost layer of the data storage discs 14a (see FIG. 2), whereas the lower supporting member 54b passes under the bottom most data storage disc 14h (as shown in FIG. 13). Further, when the pivoting assembly 50 is so moved, the force compresses the upper and lower supporting members 54a and 54b along the legs 59a and 59b of the members 54a and 54b.

Figure 8:
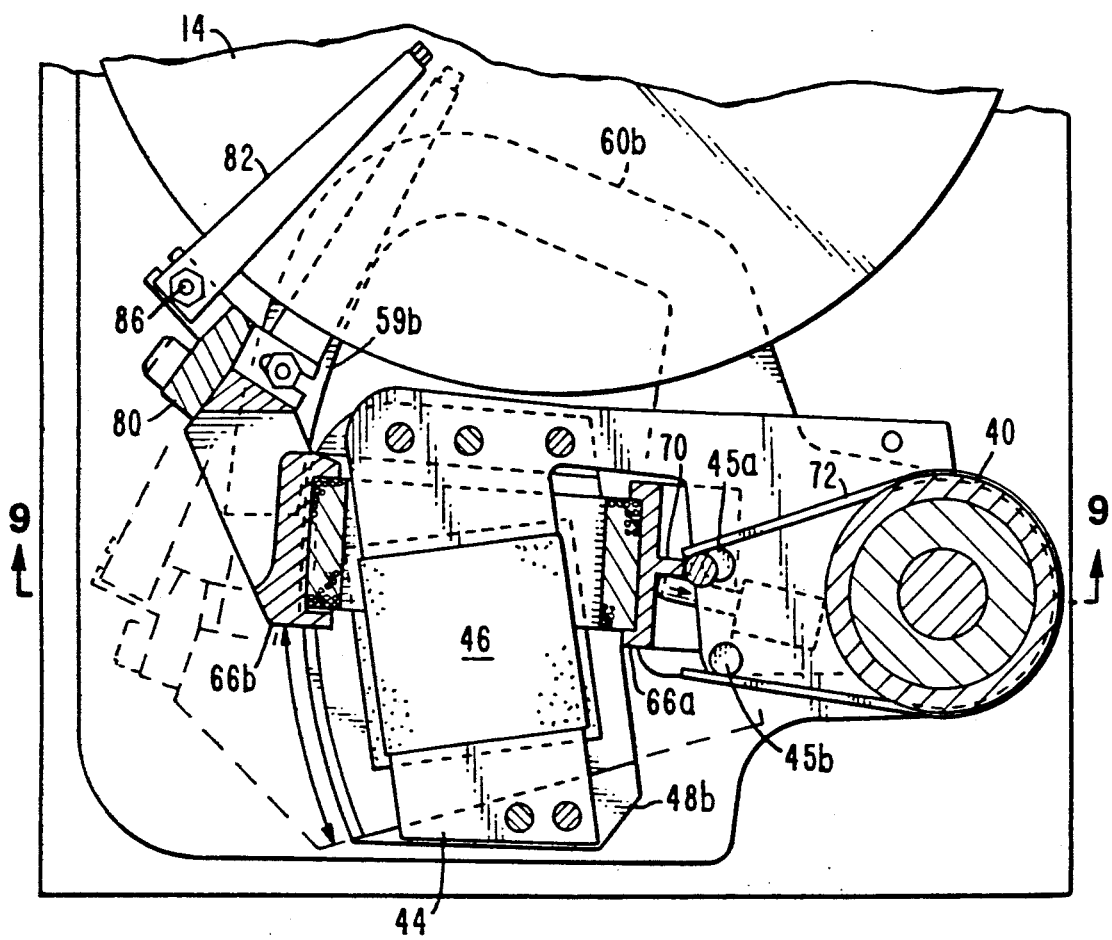
FIG. 8 is a detailed, partial cross-sectional view of the pivot assembly of the data storage disc apparatus of the present invention.
Figure 9:
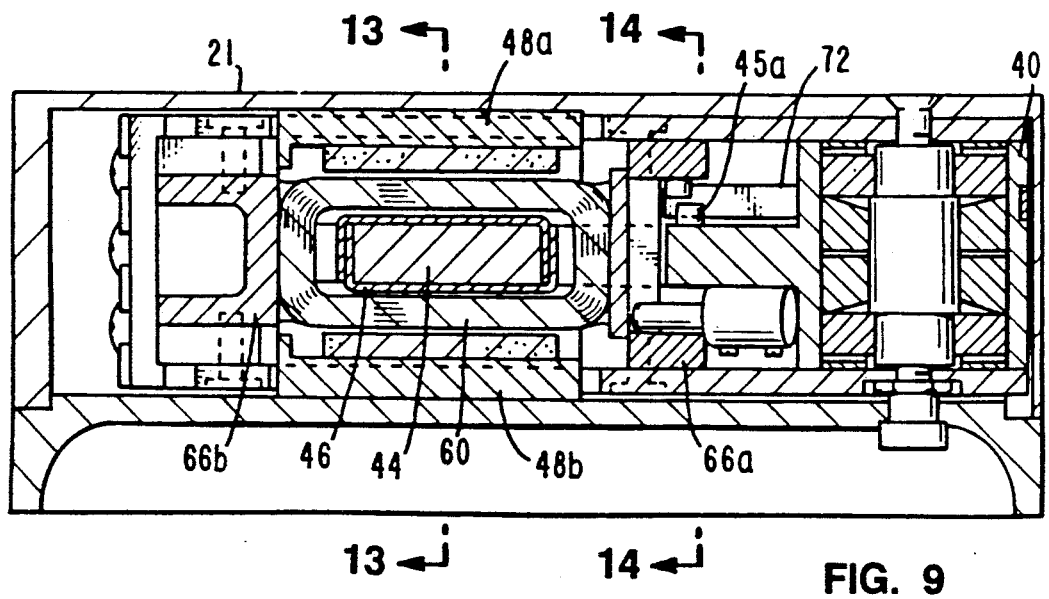
FIG. 9 is a cross-sectional view of the pivot assembly taken along the line 9-9, shown in FIG. 8.

A transducer head assembly 80 (generally shown in FIGS. 1, 2, 8 and a portion of it (transducer head block 84) is shown in FIG. 11) is attached to the pivoting end of the pivoting assembly 50. The transducer head assembly 80 has a plurality of transducer arms 82 with substantially one arm per data storage disc 14. All of the arms 82 are attached to the transducer head block 84 by an adjustable screw 86. The arms 82 extend generally in a radial direction with respect to each of the data storage discs 14. At the end of each of the transducer arms 82 is a transducer head 84. The transducer heads 84 also extend in a linear direction from the transducer arm 82. The adjusting screw 86 can be used to change the skew angle of each of the transducer heads 84 with respect to the tangent to the radius of each of the data storage discs 14. As the coil assembly is energized and as the pivoting assembly 50 pivots about the pivoting post 40, the transducer arms 82 move generally from an inner radius to an outer radius or vice versa.

The disc storage apparatus 10 is particularly adapted and is suitable for recording data on the magnetic media on each of the data storage discs 14 in "tracks", which are cylindrically-shaped concentric rings about the data storage discs 14. Further, the data storage apparatus 10 is particularly suited for recording in what is known as zone band recording format. In zone band recording, data is recorded at different densities at different radii resulting in a constant number of bits or bytes for each track. However, zone band recording requires that each transducer head 84 be maintained at a constant height above a data storage disc 14.

In the disc storage apparatus 10 of the present invention, each of the transducer heads 84 is maintained at a constant flying height above its associated data storage disc 14. This is accomplished in the following manner.

Figure 17:
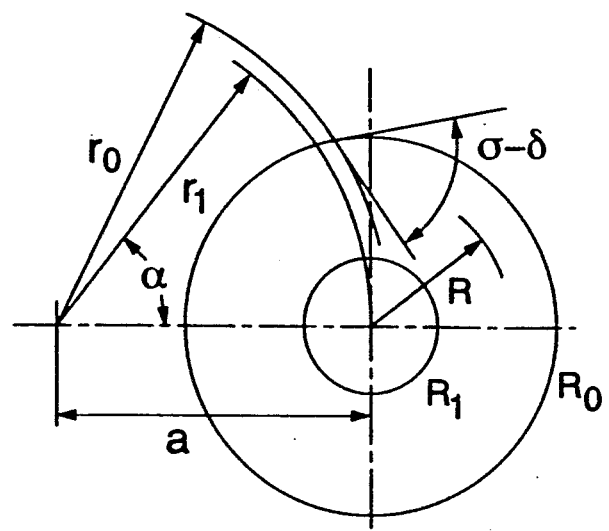
FIG. 17 is a schematic view of the geometry of the disc storage apparatus of the present invention, with the various parameters which are used in the calculation of the skew angle of the transducer head.

Referring to FIG. 17, there is shown a schematic view of the geometry of the disc storage apparatus of the present invention, with the various parameters which are used in the calculation of the skew angle of the transducer head.

The definitions used for FIG. 17 are:
a = Distance from center of pivot to center of radius
r = Radial distance from the pivot to the head:
  $r_1$ = inside head;
  $r_0$ = outside head
R = Track radius
∴ = Cylinder slope
δ = Head slope Equations For Track Cylinders
$$x^2 + y^2 = R^2$$

$$\theta = \frac{dy}{dx} = \text{Arc Tan}\left(\frac{-x}{y}\right)$$

Equations For Head Position
$$(x - a)^2 + y^2 = r^2$$

$$\delta = \frac{dy}{dx} = \text{Arc Tan}\left(\frac{a - x}{y}\right)$$

$$x = \frac{R^2 + a^2 - r^2}{2a}$$

$$y = \sqrt{R^2 - x^2}$$

$$a = \text{Arc Cos}\left(\frac{x - a}{r}\right) = \text{Arc Tan}\left(\frac{y}{x - a}\right)$$

In the present invention, the data storage apparatus 10 employs data storage discs 14 that generally have a radius of approximately 1.87 inches (4.75 centimeters). The base 12 generally has the dimensions of 4.00 inches × 5.75 inches (10.16 cm × 14.61 cm). The apparatus 10 has a height of approximately 1.62 inches. The pivoting post 40 is generally located at minus 3.0 inches from the center of radius of each of the data storage discs 14. This is in a location on the base 12 that is substantially the furthest point away from the center of the radius for the discs 14. With the pivoting post 40 so located, the distance "a" between the pivoting post 40 and the center of the radius of the data storage disc 14 is substantially at a maximum. With r equal to 2.98 inches (7.57 centimeters) representing the distance from the pivoting post 40 to the transducer head 84 in a radial direction, the variables shown in FIG. 17 would have the following values.

| R | X | Y | THETA | GAMMA | THETA-GAMMA | SKEW |
|---|---|---|---|---|---|---|
| 1.0 | −0.18660 | 0.98244 | 10.75443 | −70.7509 | 81.50529 | −8.0000 |
| 1.2 | −0.25993 | 1.17151 | 12.51006 | −66.8510 | 79.36104 | −10.1442 |
| 1.4 | −0.34660 | 1.35642 | 14.33385 | −62.9239 | 77.25774 | −12.2475 |
| 1.6 | −0.44660 | 1.53641 | 16.20799 | −58.9642 | 75.17222 | −14.3331 |
| 1.8 | −0.55993 | 1.71069 | 18.12397 | −54.9663 | 73.09025 | −16.4150 |

As can be seen from the above, at R = 1.0, the value of "theta−gamma" is 81.50529 degrees. If −89.50529 degrees were added to the value of "theta−gamma", the resultant "skew" angle would be −8.000 degrees. If the same value of −89.50529 degrees were added to each of the respective values "theta−gamma", the result would be the degree shown under the column "skew". In short, if a constant number of degrees was added to each of the values of "theta - gamma" at various R settings, the skew angles would have the resultant values, as set forth in the above table.

Figure 16:
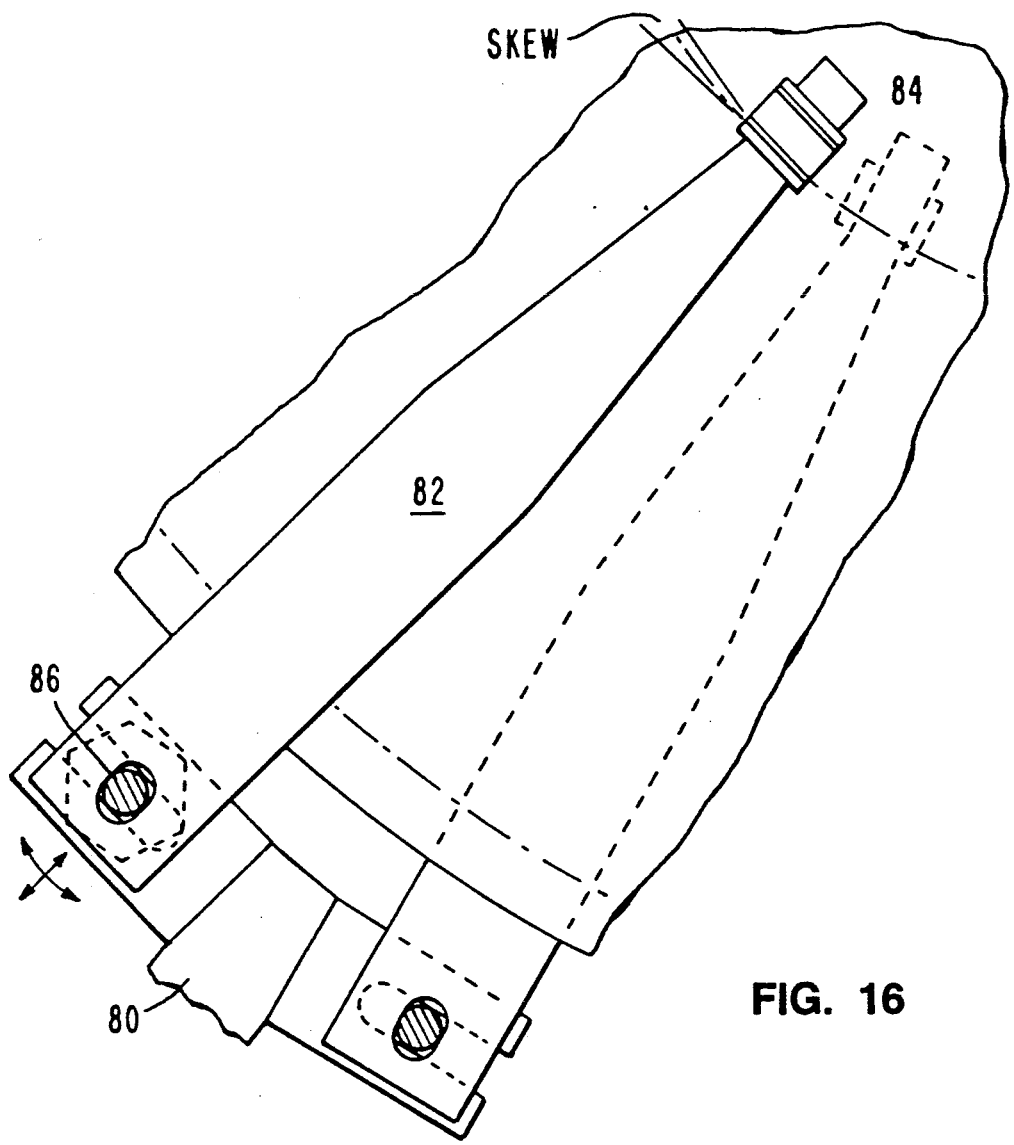
FIG. 16 is a top view of the disc storage apparatus of the present invention showing a transducer head having its skew angle adjusted such that it is tangent to the radius of the data storage disc at one of the radius distances.

The constant angle is accomplished by changing the adjusting screw 86, such that the transducer head 84 would have the resultant skew angle of −8.000 degrees when R = 1.0. Thus, as shown in FIG. 16 which shows the transducer head 84 at a distances of substantially R = 1.0, the adjusting screw 86 can be adjusted such that the transducer head 84 is positioned with a skew angle of −8.000 degrees with respect to the tangent to the radius R at 1.0. When the transducer head 84 is so set, the transducer head 84 would then have a skew angle as shown in the above table for other values of R. That is, as R increases, the skew angle also increases.

Figure 18:
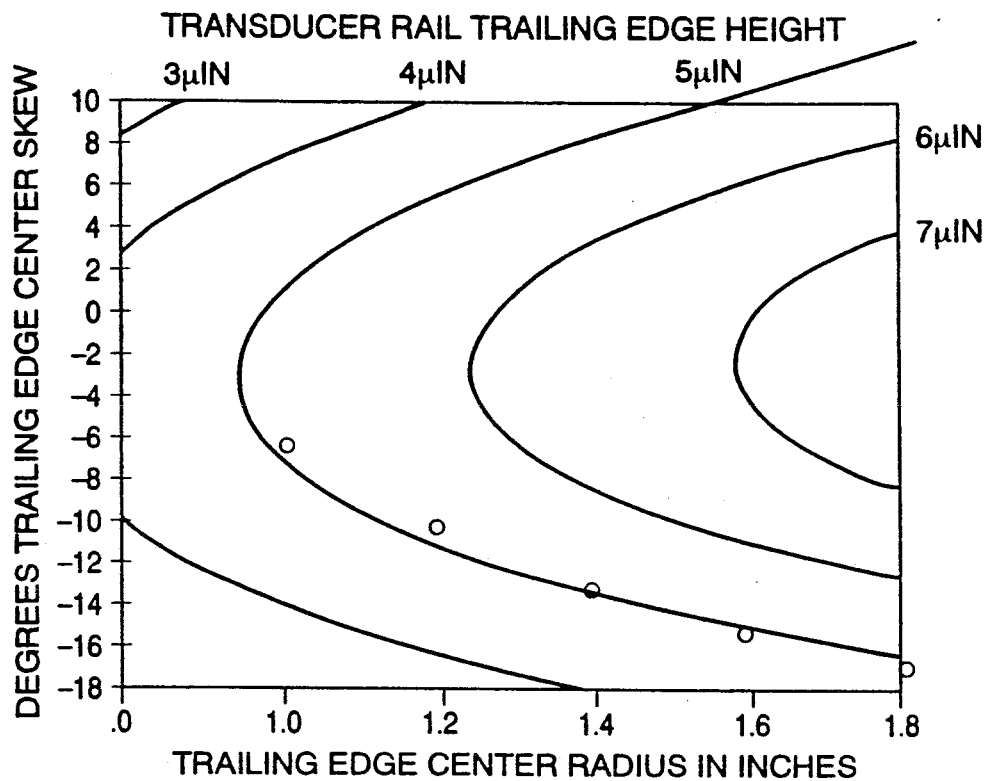
FIG. 18 is a graph showing the skew angle as a function of the radius of the data storage disc and the various constant height level graphs.

FIG. 18 shows a graph of skew angle versus radius of the disc. Further it shows the constant flying height contours. From FIG. 18, it can be seen that, based upon the particular geometry of the present disc storage apparatus 10, wherein the pivoting post 40 is at a large distance away from the center of the radius of the data storage discs 14, the resultant skew angle at different radii R would result in the transducer heads 84 flying at a substantially constant height of 5 microinches. In short, by varying the skew angle as a function of the distance of R, a substantially constant flying height of the transducer head 84 with respect to the surface of each of the data storage discs 14 can be maintained. In this manner, zone band recording can be accomplished.

Figure 19:
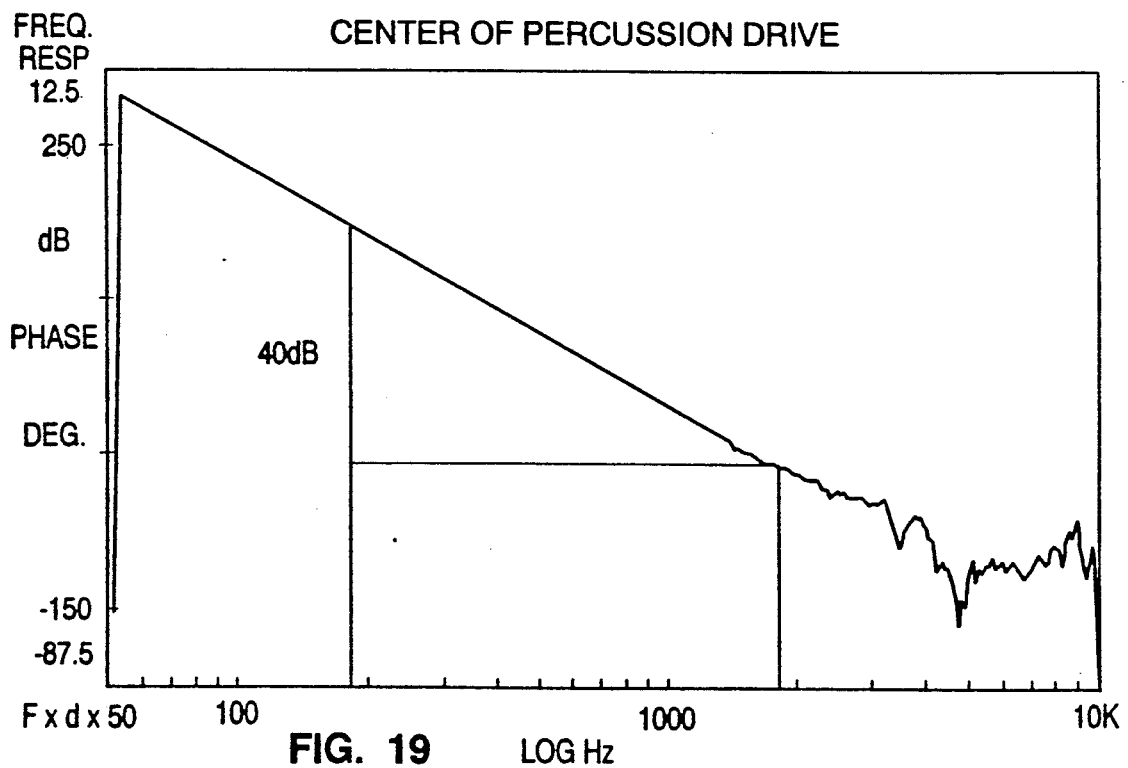
FIG. 19 is a graph of a Bode plot of the mechanical frequency response of the disc storage apparatus of the present invention.

There are many advantages to the data storage apparatus 10 of the present invention. First, by having a support member 54 having an arcuate region between its ends, when the pivoting assembly 50 is pivoted about the pivoting post 40, greater mechanical stability is achieved. This results in greater frequency response. A Bode plot of the frequency response of the data storage apparatus 10, shown in FIG. 19, shows that the apparatus 10 is devoid of any high gain frequency resonances.

Secondly, by using a retaining clamp 18, discs 14 can be made out of fragile material, such as glass. Further, the retaining clamp 18 provides greater uniform load distribution with far less contamination of the discs 14 compared to a conventional screw during the clamping and removal process.

Finally, by being able to change the skew angle of the transducer head 84 relative to the tangent to the radius of the disc 14, the transducer head 84 can be maintained at a substantially constant flying height, resulting in zone band recording.

The theoretical basis of the invention can be understood as follows. The problem to be solved in the apparatus 10 of the present invention is to position, in a very short time span, a magnetic transducer, accurately and in a dynamic fashion, over a track on a rotating disc. The major components of the tolerance affecting accuracy are:

1. Accumulation of tolerances from many parts (so called stack-up of mechanical parts);
2. Temperature;
3. Interchangeability;
4. Dynamics (pull in, spindle runout, vibration);

Improved performance (i.e. cost, capacity, access time) can be obtained by increasing track density (tracks per inch TPI) to the limits controlled by the components affecting head positioning tolerances.

One of the prior art improvements in disc drive performance was the application of servo control. The electrical signal is transduced from the disc surface to a magnetic head, transformed to an amplified electrical current, then transmitted to a voice coil motor (VCM) which caused precise movement of the transducer head. This technology eliminated virtually all static tolerances for head positioning used in open loop type drives, such as stepper motor or mechanical detenting for position control. (There exists a class of drives which utilize an external from the disk, a position transducer such as a glass reticule associated with a VCM. These drives can have reduced access time but not substantially improved position control.)

With static tolerances virtually controlled, the designer of a disc drive must concentrate not only on the static tolerances but also the dynamic tolerances. The goal now becomes to improve servo control to reduce the dynamic tolerances. The desired method for improved servo control is to increase gain.

The technique most commonly used to measure the dynamic quality of a mechanical design is the Bode plot. This is a plot of (output of head position/input of coil current) vs. frequency. A good Bode plot will be devoid of High Q mechanical resonances, i.e. peaks in the curve.

With a good Bode plot, high servo loop gain can be achieved and the following advantages will be obtained:
1. Fast, crisp, actuator response;
2. Minimization of undershoot and overshoot;
3. Good servo stability;
4. Immunity from external vibration;

5. Ability to follow non-repeatable spindle runout.

To prevent in-line mechanical resonances, thereby obtaining a good Bode plot, the following design rules should be observed:
1. Avoid applying in-line forces through ball bearings;
2. Avoid bending structural members; structural members can be compressed or tensioned;
3. Position or couple forcing elements close to the transducing elements (heads);
4. Avoid cantilevered masses;
5. Mount spindle and actuator from both sides (top and bottom of base plate).

To obtain a good Bode plot, the mechanical designer must obey all the above design rules.

There are two basic types of positioners, linear (moving in a straight line) and rotary. The characteristics of each are as follows:

Linear:
1. Good frequency response (good Bode plot);
2. Requires large space;
3. Expensive;

Rotary:
1. Prior Art design has poor frequency response;
2. Lower cost;
3. Requires less space than linear positioners;

A recent development in the industry is the introduction of zone banding recording. This requires nearly constant flying height. Constant flying height can be achieved by selecting a drive geometry to match the flying characteristics of the slider. This is done by placing the pivot center in relation to the spindle center and the head radius in such a manner that the correct head skew angle as a function of the track radius is achieved. This is an advantage of the rotary positioner over a linear positioner. The linear positioner cannot achieve constant flying height.

Since the 3½ inch standard size drive does not allow sufficient room for a linear positioner using a VCM actuator, a rotary positioner must be used. Heretofore, all of the prior art 3½ inch drive with VCM positioners have suffered from failure to observe all of the design rules set forth hereinabove. For example, most have been designed with the VCM actuator at one end of a member, with the transducing elements at another end of the member and with a ball bearing pivot therebetween. This violates rule number one. Others, such as those disclosed in U.S. Pat. Nos. 4,300,176 and 4,751,597, have used cantilevered masses, which violate rule #4. In short none have been satisfactorily designed with resulting good Bode plots.

What is claimed is :

1. In a disc storage apparatus having a spindle with a central axis, a plurality of data storage discs mounted on said spindle, and motor means connected to said spindle for rotating said discs, wherein the improvement comprising:
   a retaining member in the shape of a ring with a central hole and a plurality of spaced-apart tooth-shaped members positioned circumferentially about said ring protruding into said central hole;
   said retaining member positioned with said spindle through said central hole, with said retaining member substantially abutting one of said data storage discs, with said plurality of tooth-shaped members urging against a side of said spindle substantially parallel to said central axis thereby clamping said data storage discs by said tooth-shaped members urging against said side.

2. The apparatus of claim 1, wherein said discs are made of glass.

3. A disc drive comprising:
   a base;
   a spindle having an axis;
   a plurality of data storage discs mounted on said spindle;
   motor means on said base, connected to said spindle for rotating said discs about said axis;
   a retaining clamp in the shape of a ring with a central hole and a plurality of spaced-apart tooth-shaped members positioned circumferentially about said ring protruding into said central hole;
   said retaining clamp positioned with said spindle through said central hole, and substantially abutting one of said data storage discs with said plurality of tooth-shaped members urging against a side of said spindle substantially parallel to said axis thereby clamping said data storage discs by said tooth-shaped members urging against said side.

4. The apparatus of claim 3, wherein said discs are made of glass.

5. In a new use of a retaining member in the shape of a ring with a central hole and a plurality of spaced-apart tooth-shaped members positioned circumferentially about said ring protruding into said central hole, wherein said method comprising:
   inserting said retaining member over a spindle of a disc drive having a central axis with a plurality of data storage discs mounted therein, with said spindle through said central hole,
   moving said retaining member in a direction substantially parallel to said central axis to said discs until said retaining member abuts substantially against one of said data storage discs with said plurality of tooth-shaped members urging against a side of said spindle substantially parallel to said central axis thereby clamping said data storage discs by said tooth-shaped members urging against said side.

* * * * *